VIBRATORY FINISHING APPARATUS AND METHOD

Original Filed Dec. 27, 1965 4 Sheets-Sheet 1

INVENTORS
Eugene E. Olson,
Harold H. Mickelson
BY
Harness, Dickey & Pierce
ATTORNEYS

VIBRATORY FINISHING APPARATUS AND METHOD

Original Filed Dec. 27, 1965 4 Sheets-Sheet 2

INVENTORS
Eugene E. Olson,
Harold A. Mickelson
BY Harness, Dickey & Pierce
ATTORNEYS.

VIBRATORY FINISHING APPARATUS AND METHOD

Original Filed Dec. 27, 1965 4 Sheets-Sheet 3

INVENTORS
Eugene E. Olson
Harold A. Mickelson
BY Harness, Dickey & Pierce
ATTORNEYS VIBRATORY FINISHING APPARATUS AND METHOD
Original Filed Dec. 27, 1965 4 Sheets-Sheet 4
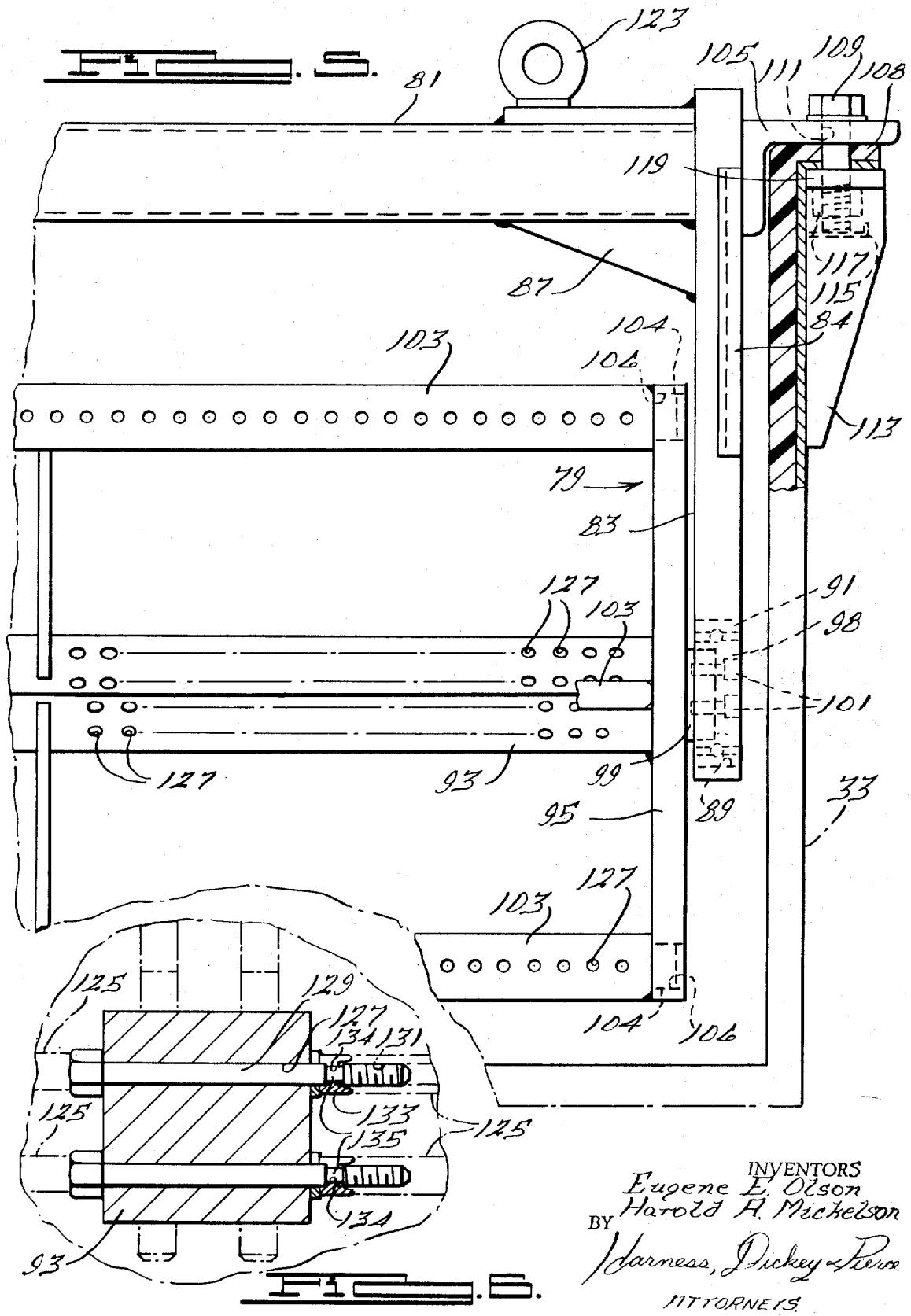
INVENTORS
Eugene E. Olson
Harold A. Mickelson
BY
Harness, Dickey & Pierce
ATTORNEYS United States Patent Office Re. 27,412
Reissued June 27, 1972

27,412
VIBRATORY FINISHING APPARATUS AND METHOD

Eugene E. Olson, Addison, Ill., and Harold A. Mickelson, Albert Lea, Minn., assignors to King-Seeley Thermos Company, Ann Arbor, Mich.

Original No. 3,371,449, dated Mar. 5, 1968, Ser. No. 516,514, Dec. 27, 1965. Application for reissue Feb. 2, 1970, Ser. No. 884,765
Int. Cl. B24b *31/06*
U.S. Cl. 51—163 18 Claims

Matter enclosed in heavy brackets [ ] appears in the original patent but forms no part of this reissue specification; matter printed in italics indicates the additions made by reissue.

*ABSTRACT OF THE DISCLOSURE*

*A workpiece finishing device comprising, enclosure means containing an abrasive media, fixture means adapted to support a workpiece during a finishing operation, means rotatably supporting the fixture means about a longitudinal axis, and means for effecting movement of the enclosure means and the fixture means about a preselected path transverse to the axis and for rotating the fixture means about the axis, whereby to move workpieces supported on the fixture relative to the media.*

The present invention relates generally to workpiece finishing and particularly to an improved apparatus and method for finishing workpieces to a high degree of accuracy and uniformity.

The apparatus and method of the present invention is of the type generally in which workpieces are immersed in an abrasive media, and through relative movement between the workpieces and the abrasive media the exposed surfaces of the workpieces are finished. In the past, finishing apparatus and methods of this type produced relative movement between the workpieces and the media in a number of fashions. Thus, in some installations, the workpieces are secured to a workpiece fixture rotatably supported in a tank or tub in which the abrasive media also is disposed. The fixture is rotated in its support either by hand or by a power drive thereby moving the workpieces through the media causing the finishing process. In some cases where a closed tub is used, rotation is imparted to the tub in the opposite direction to that of the fixture thereby increasing the relative movement between the workpieces and the media. Other installations fixedly or loosely support the workpieces in a tub and agitate the tub and therefore the abrasive media therein causing the media to move past and finish the workpieces.

All of these prior art devices achieve some degree of accuracy and uniformity in finishing workpieces. In the most efficient of these devices where both the tub and the workpiece fixture are moved under power, the complexity of the power transmission and its mounting adds significantly to its overall cost. In others, where only the workpieces undergo significant movement, considerable time is required to achieve finished workpieces having a high degree of accuracy and uniformity. Therefore, a need exists for a workpiece finishing arrangement achieving a high degree of accuracy and uniformity in a minimum amount of time and with a minimum complexity of power drive and transmission components.

Main objects of the present invention, therefore, are an improved workpiece finishing apparatus and method adapted to finish workpieces to a high degree of accuracy and uniformity and wherein the finishing process is performed in a minimum amount of time and the apparatus embodies a relatively simple power drive and transmission.

Further objects of the present invention include a workpiece finishing apparatus and method of the above character adapted to finish a relatively large number of workpieces at one time in a minimum amount of space and all of which workpieces are subjected to a substantially uniform finishing operation.

Other objects include a workpiece finishing apparatus of the above character which is relatively inexpensive to manufacture, rugged in construction and reliable in use, and a method of the above character which is efficient, effective and uniform in result.

Additional objects and advantages of the present invention will become more apparent from a consideration of the following detailed description taken in conjunction with the drawings in which:

FIG. 5 is a side view of a portion of FIG. 4; and

FIG. 6 is an enlarged sectional view of the workpiece mounting structure.

Figure 1:
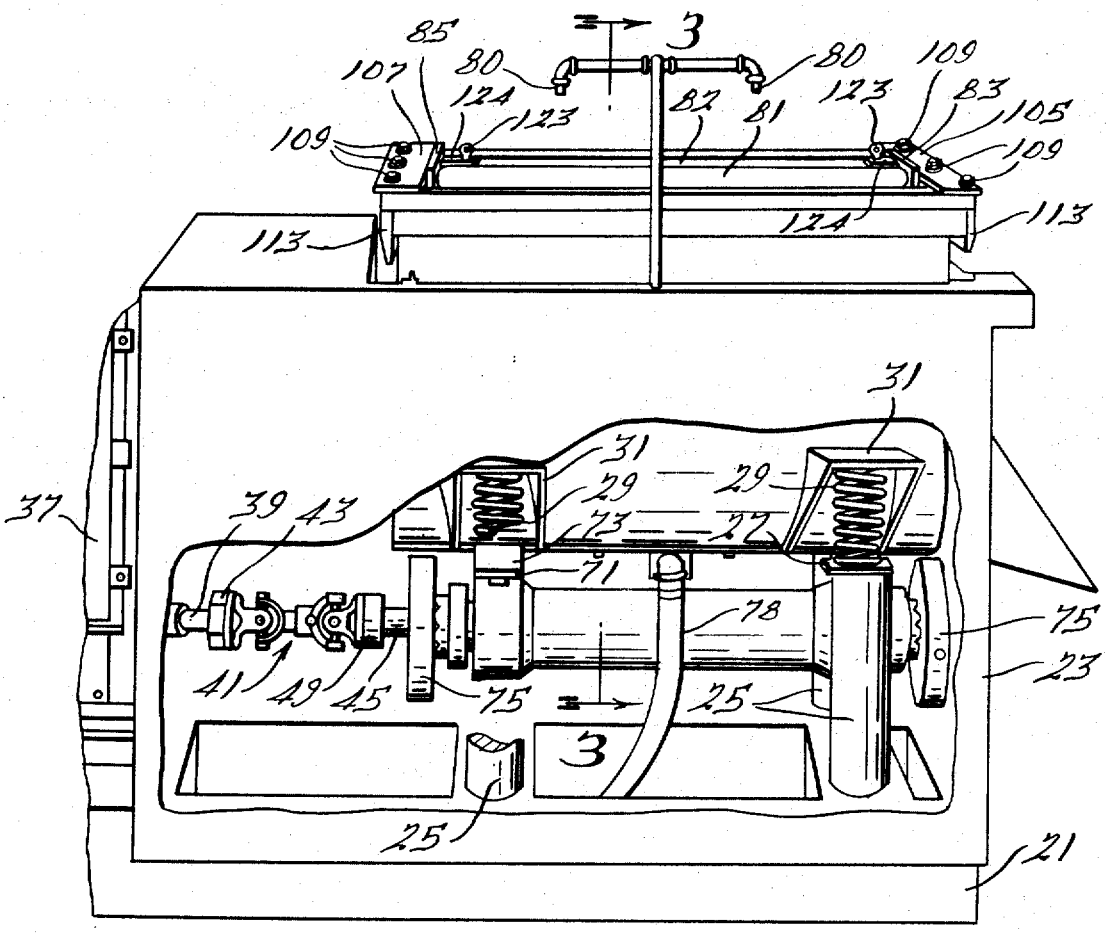
FIG. 1 is a perspective view, partly broken away, illustrating a device embodying the present invention.
Figure 2:
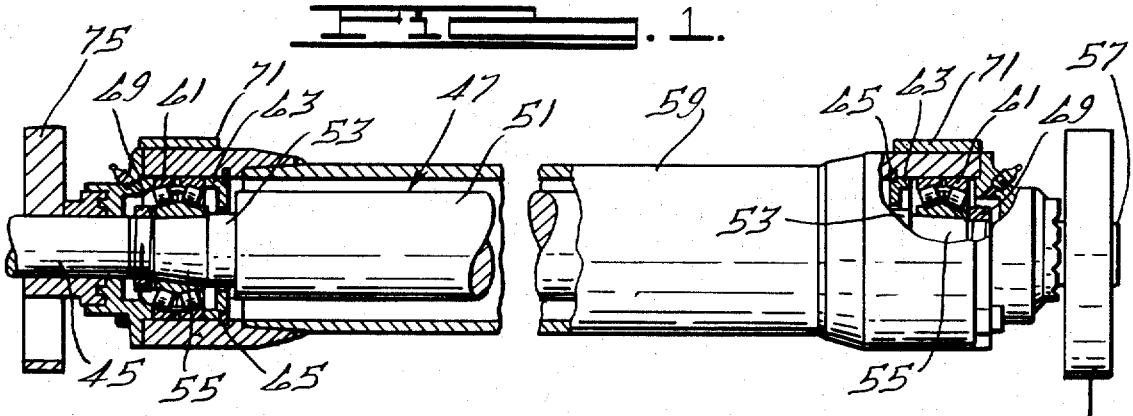
FIG. 2 is an enlarged view, partly in section, illustrating the drive train components.

Broadly described, the present invention includes a fixture having workpieces secured thereto and rotatably supported along a longitudinal axis within a tub having abrasive media dispersed therein and wherein said tub and therefore said fixture are moved in an orbital path transverse to said axis imparting orbital movement to the media which causes the fixture to rotate about said axis. In addition, the workpiece fixture is constructed to hold and locate a maximum number of workpieces in a manner so that each is subjected to substantially uniform depth within the tub during the finishing operation.

Referring now more specifically to the drawings, a workpiece finishing apparatus embodying and adapted to perform the present invention is seen to include a base 21 having a generally rectangular tub encasement 23 fixed thereto and supported thereon. A set of four rectangularly disposed upstanding posts 25 are disposed within the encasement 23 and are secured at their lower ends to the base 21. Each of the posts 25 has a plate 27 fixed to its upper end to which the lower ends of four compression springs 29 are secured. The upper ends of the springs 29 are each disposed in and fixed to a respective one of four inverted generally U-shaped channel members 31, each of which channel members is welded or otherwise suitably secured to a tub 33. Thus, the tub 33 is resiliently supported upon the posts 25 and base 21 for universal movement.

A variable speed electric drive motor (not shown) is supported in a motor housing 37 also fixed upon the base 21 adjacent one end of the encasement 23. The motor (not shown) has an output shaft 39 extending through adjacent ends of the motor housing 37 and the encasement 23 and is connected to one end of a double or constant velocity universal joint 41 by a coupling 43. The other end of the universal joint 41 is connected to a reduced end 45 of a vibrator shaft 47 by another coupling 49.

The vibrator shaft 47 has a large cylindrical center section 51 having a reduced portion 53 and an outer tapered portion 55 on either side of the center section 51. The reduced end 45 is formed adjacent the outer end of one tapered portion 55 and another reduced end 57 is formed adjacent the outer end of the other tapered poron 55. A sleeve 59 spacedly surrounds a major portion the shaft 47 and removably receives a pair of roller aring assemblies 61, the inner races of which are seated the shaft tapered portions 55. The bearings 61 are ch held in the sleeve 59 by an inner annular member seated against a retainer ring 65 and by a lock nut 69 readed on the shaft reduced ends 45, 57.

The sleeve 59 is connected to the tub 33 by a spaced ir of brackets 71 each of which is bolted to a respective e of a spaced pair of arms 73 which are welded or herwise secured to the tub 33. The brackets 71 are each cated adjacent a respective one of the bearings 61.

The shaft 47 is constructed to inpart rapid orbital ovement to the tub 33 during shaft rotation. Thus, the aft center section 51 has its longitudinal central axis fset relative to the axis of the reduced ends 45, 57, the pered portions 55 and the portions 53, so that when the aft 47 is rotated by the motor shaft 39, the axis of this fset center section 51 travels in an orbital path. Since the nter section 51 constitutes a major portion of the mass the shaft 47, this orbital travel generates a reaction rce on the tapered portions 55 causing them also to avel in an orbital path during shaft rotation. This movent is, in turn, transferred to the brackets 71 and arms and thence to the tub 33, causing it to orbit. The rings 29 afford smooth and quiet orbital travel of the b 33 and the universal joint 41 permits orbital movement the shaft 47 without binding the motor shaft 39. The nplitude of orbital travel of the tub 33 is controlled and ay be varied by means of a pair of eccentric counterighst 75 adjustably mounted on the reduced ends 45, 57 the shaft 47 and which may be secured in desired difrent rotative positions relative to the center section 51. thus far described, the structure is conventional and ll known.

The tub 33 is adapted to have abrasive media 77 loosedispersed therein and a work holding fixture 79 rotatly supported therein. Preferably, a liquid compound is rayed into the hub 33 through one or more nozzles 80 maintain the workpieces and the media 77 clean roughout operation of the device. A drain tube 78 is ovided at the bottom of the tub 33 to maintain liquid ntent at a desired level and drain off the excess. In adion, the inner surface of the tub 33 preferably has a otective lining 84 constructed of neoprene or other suitle material molded to the tub surface to insure long e and quiet operation.

Figure 3:
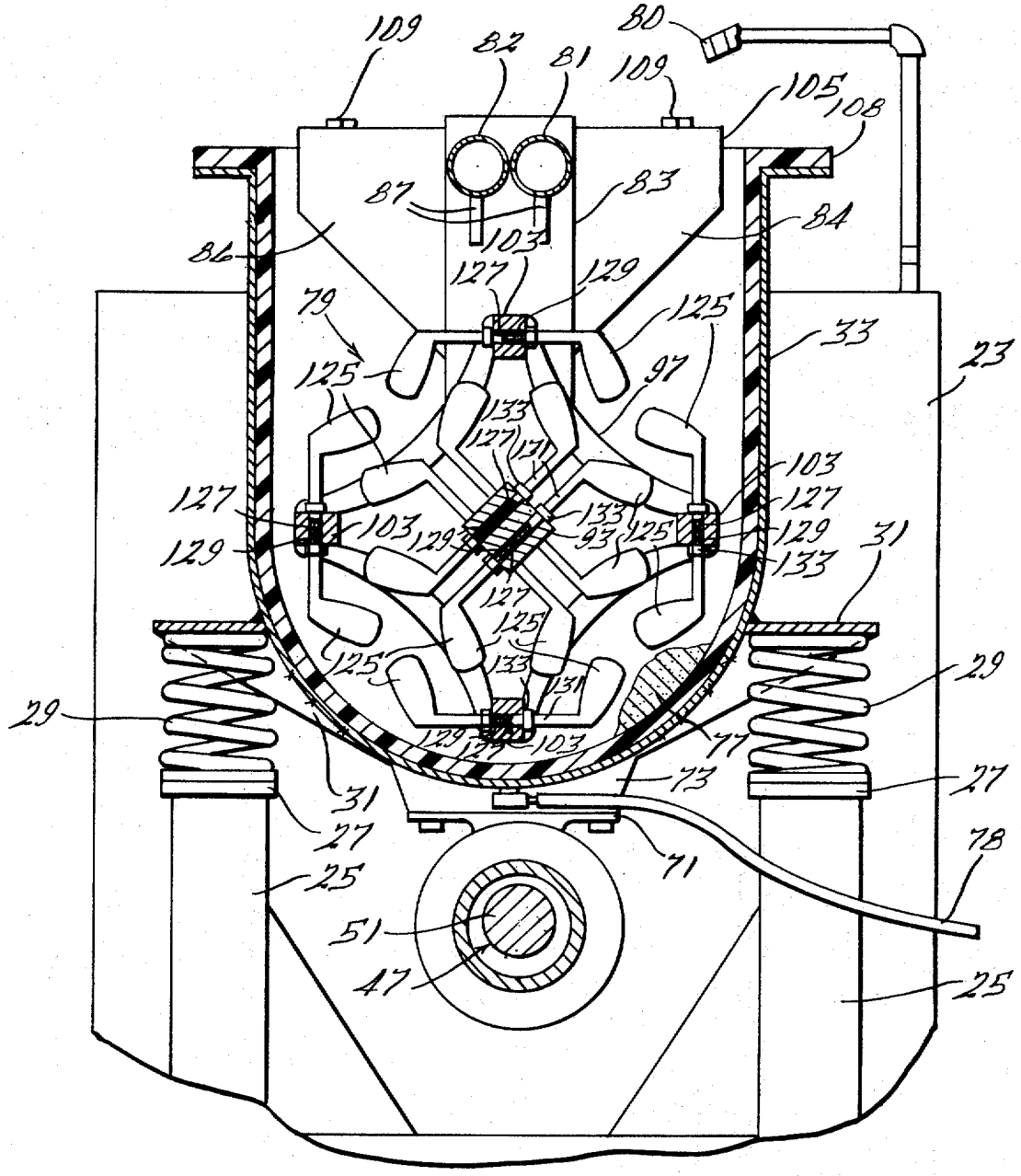
FIG. 3 is an enlarged sectional view of the structure of FIG. 1 taken substantially along the line 3—3 thereof.
Figure 4:
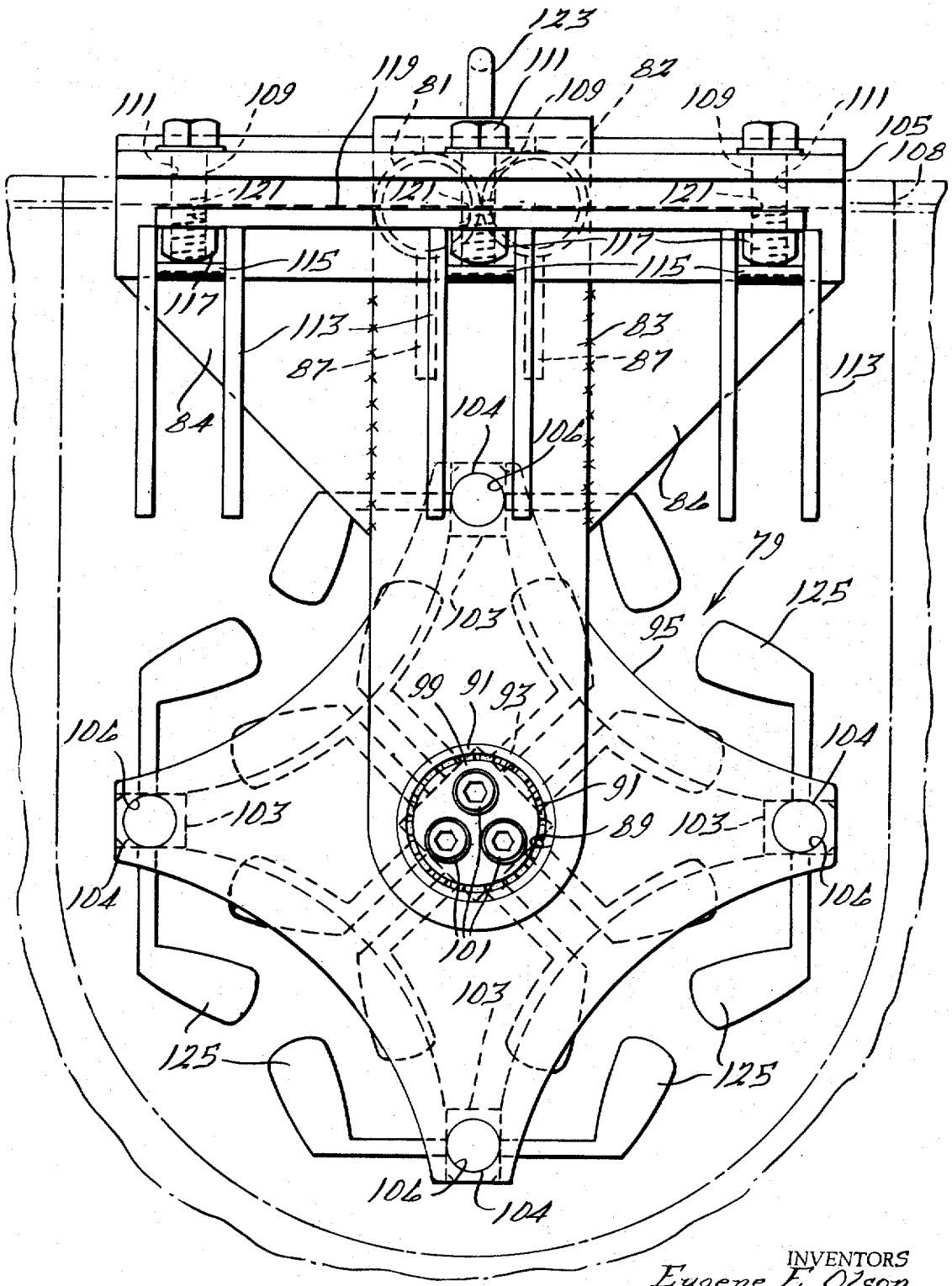
FIG. 4 is an enlarged end view of the fixture device of the present invention.

The fixture 79 is seen in FIGS. 3, 4 and 5 and includes pair of generally horizontal extending rigid tubular embers 81, 82 having a pair of downwardly extending m 83, 85 fixed to their outer ends as by welding. Reinrcing members 87 are fixed between the tubular memrs 81, 82 and each of the arms 83, 85 by welding thereas seen in FIG. 5. A pair of gussets 84, 86 are welded the opposite sides of each arm 83, 85, respectively, to id support thereto. The lower ends of the arms 83, 85 apertured as at 89 to receive outer races 91 of bearings ich are press-fitted within the apertures 89. A rectangu- fixture bar 93 extends between the arms 83, 85 near ir lower ends and has a pair of end plates 95 welded or herwise suitably fixed thereto adjacent each end thereof. stub shaft 99 at each end of the fixture bar 93 extends ough each end plate 95 and through inner races 98 of bearings and is fixed to the inner races by screws 101. In the illustrated embodiment, a set of four rectangular ture bars 103 are fixed by welding to and extend beeen the end plates 95 one at each corner thereof. Each the bars 103 has a reduced conveniently cylindrical d 104 received in openings 106 in the end plates 95 for ded rigidity.

The fixture 79 is removably supported upon the tub 33 ough a pair of elongated angles 105, 107 welded or herwise suitably secured to the outer upper surfaces of arms, 83, 85, respectively, and to the gussets 84, 86. ch of the angles 105, 107 is adapted to seat upon an outwardly extending flange 108 adjacent the upper edge of the tub 33 and is provided with a plurality of bolts 109 extending downwardly through spaced vertical apertures 111 therethrough. A corresponding number of brackets 113 are secured to the outer upper surface of each side of the tub 33 in alignment with the bolts 109. Each of the brackets 113 has a generally horizontally disposed shelf 115 fixed thereto, each of which is adapted to support a nut 117.

When the fixture 79 is placed in the tub 33 with the angles 105, 107 resting atop the tub flange 108, as shown, the screws 109 are aligned with the nuts 117 and can be threaded therein by turning the screw heads. The nuts 117 are sized so as not to be able to turn freely within the brackets 113 but can move axially therewithin. A plate 119 welded or otherwise suitably secured to the tub 33 beneath the flange 108 overlies the top of each set of brackets 113 and limits upward movement of the nuts 117. The plate 119 is apertured at 121 to freely receive the screws 109 so that when these screws are threaded into the nuts 117, the nuts are pulled upwardly against the plate 119 and cause the angles 105, 107 to move downwardly and firmly seat against the tub top flange 108.

When it is desired to remove the fixture 79 from the tub 33, the bolts 109 are removed from the nuts 117 and the fixture 79 lifted out of the tub 33. Conveniently, a pair of eyes 123 and supporting arms 124 may be secured to the fixture tubular members 81, 82 and to the arms 83, 85 by welding for easy handling of the fixture 79 during insertion into and removal from the tub 33.

The workpieces to be finished are shown in the illustrated preferred embodiment as golf club heads 125. It is to be understood, however, that the present invention pertains also to and is particularly useful in finishing other workpieces having irregular surfaces, such as, for example, gun barrels and receivers, cutlery, etc., because of the highly efficient and effective abrasive finishing action produced thereby. These workpieces are removably secured to the fixture bars 93, 103 for movement therewith within the tub 33. As shown in FIGS. 3 and 6, the fixture bar 93 is provided with a plurality of spaced openings 127 through each of which the unthreaded body portion of a bolt 129 freely extends. The same is true of bars 103 as appears in FIG. 3. The outer ends of bolts 129 are threaded to receive the internally threaded shaft ends 131 of the workpieces 125 (FIG. 6). A conventional split lock washer 133 has a radially inwardly extending flange 134 loosely fitted in an annular groove 135 on each of the screws 129 to hold the screws in place on the bars 93, 103 and the washer 133 serves as an abutment for the workpiece threaded end 131. Thus, the workpieces 125 are initially threaded on the ends of the bolts 129 and are angularly located as shown in FIG. 3. Thereafter, the bolts 129 are tightened to pull the workpieces snugly against the washers 133 and these washers are moved snugly against the fixture bar 93 by the loose axial fit between the bolt flanges 134 and the grooves 135.

In use, the fixture 79, with the workpieces 125 in place thereon, is placed in position in the tub 33 along with the abrasive media 77. The angles 105, 107 are supported on the top edges of the tub 33 and the bolts 103 threaded into the nuts 117 to insure a secure mounting. Thereafter, the drive motor (not shown) is started and causes the shaft 47 to rotate and orbit by virtue of the offset shaft center section 51 as described above. The tube 33 also takes part in this orbital travel and since the fixture 79 is rigidly supported by the tub 33, the fixture 79 also orbits in the same path. The abrasive media 77, being loosely disposed in the tub 33, is caused to orbit therewithin and tumble relative to the tub 33 and the fixture 79. This tumbling action and orbital travel of the abrasive media 77 causes the fixture 79 to turn or rotate about a central axis passing through the stub shafts 99, the bearings 91 allowing this free turning movement or rotation to exist. By virtue of the fixture rotation and the tumbling action of the abrasive media 77, a highly effective "double scrubbing" abrasive action is realized on the workpieces 125. Also, by reason of the workpieces 125 being secured to the fixture 79, the workpieces cannot collide during finishing and do not, therefore, become undesirably scratched or nicked.

This rotational fixture movement is relative to the orbital tumbling of the media and this double relative movement greatly speeds the finishing operation on the workpieces. Furthermore, and perhaps more importantly, this double scrubbing action is accomplished with only a single and relatively simple drive means and transmission. This fact greatly reduces the initial cost and maintenance expenses for the apparatus over those heretofore known and used, capable of a "double scrubbing" action, which required independent drives or a drive and a relatively complex and expensive power transmission device for drivingly moving the tub and fixture relative to each other.

By way of illustration, the finishing apparatus of the present invention performs a highly accurate and effective finishing operation on as many as in excess of 300 golf club head workpieces in a total finishing cycle time of about three hours. In this exemplary finishing cycle, the output shaft 39 of the electric drive motor (not shown) rotates at a speed of from about 900 to about 2150 r.p.m. and the radial amplitude of travel of the tub 33 is from about 1/64 to about 5/16 inch. This causes the fixture 79 to revolve at a speed once about every 1 to 10 minutes and preferably about once in 83 seconds. This causes the abrasive media 77 to migrate about the tub 33 about 4 to 6 times per minute and provides the desired double scrubbing action referred to above and achieves a highly accurate finishing effect on the workpieces in a time not heretofore possible.

Another feature of the present invention is the construction of the fixture 79 and the mounting of the workpieces 125 thereon which affords uniform workpiece finishing and a maximum number of workpieces carried by the fixture. As shown in FIG. 5, each set of opposite parallel sides of the fixture bar 93 has two parallel rows of equally spaced openings 127. The openings 127 through each set of parallel sides of the fixture bar 93 are intermediate the openings 127 through the adjacent set of parallel sides. The workpieces 125 are mounted in pairs or sets of the openings 127, one pair in the first set of openings 127 and extending outwardly from one side of the bar 93, the next pair in the second set of openings 127 and extending outwardly from the opposite side of the bar 93, and so on (FIG. 6). Similarly, the workpieces are mounted in pairs extending outwardly from the other two sides of the bar 93 in alternate fashion. Since the openings 127 on each side of the bar 93 are intermediate the openings 127 on each adjacent side, no interference is encountered between the screws 129 on their heads. Furthermore, as seen in FIGS. 3 and 4, each of the workpieces 125 on the bars 93 and 103 is subjected to substantially the same maximum depth within the tub 33 and therefore substantially the same maximum pressure of the abrasive media 77 is exerted on each workpiece. This results in each of these workpieces 125 being finished to a uniform degree.

The fixture bars 103 are each mounted equidistant from the rotational axis of the fixture 79, or the axis of the stub shafts 99. Each of the fixture bars 103 has a spaced plurality of aligned openings 127 through opposite sides thereof. The workpieces 125 are mounted on each bar 103 in alternate fashion using the screws 129, one extending outwardly to one side of each bar 103, the next extending outwardly to the opposite side of each bar 103, and so on. By this arrangement, a maximum number of workpieces 125 is carried by each fixture bar 103 and each workpiece is subjected to the same maximum depth and finishing pressure throughout fixture rotation. In addition, each of the workpieces 125 on the fixture bars 103 is subjected to substantially the same maximum depth and finishing pressure as each workpiece 125 on the fixture bar 93 and all of the workpieces experience this maximum depth once for each revolution of the fixture 79. The result is that a maximum number of workpieces are carried by the fixture 79 and each is finished to a very high degree of uniformity.

It will be understood that in some instances, it may be possible and desirable to add more fixture bars 103. Alternatively, it may be necessary in some cases to eliminate one or more of these bars 103 and/or to adjust their location. Furthermore, the particular construction of the workpiece securing means, such as the screws 129, and the spacing of the openings 127 may vary for other type workpieces. Basically, however, the present invention contemplates a center fixture bar 93 and a plurality of outer fixture bars 103 equidistant from the center bar 93 and arranged to carry a maximum number of workpieces and achieve a high degree of uniformity in the finishing thereof.

While a preferred form of the invention has been illustrated and described above in detail, various additions, substitutions, modifications and omissions may be made thereto without departing from the spirit of the invention as incorporated by the appended claims.

What is claimed is:

1. A workpiece finishing device comprising a tub adapted to have abrasive media dispersed loosely therein, a fixture having workpieces secured thereto and rotatably supported along a longitudinal axis within said tub, and drive means causing said tub and fixture to move in an orbital path transverse to said axis and said abrasive media to move through an orbital path within said tub thereby causing said fixture to rotate about said axis and move relative to said media.

2. A workpiece finishing device as claimed in claim 1 which includes a base and wherein said tub is supported upon said base for universal movement.

3. A workpiece finishing device as claimed in claim 2 and which includes compression spring means supporting said tub upon said base.

4. A workpiece finishing device as claimed in claim 1 wherein said fixture includes a frame fixed to said tub and having a depending portion suspended within said tub, a bar carried by said depending portion for rotation about a longitudinal axis and having said workpieces secured thereto.

5. A workpiece finishing device as claimed in claim 4 wherein said tub has an open top and wherein said fixture has spaced depending portions suspended within said tub.

6. A workpiece finishing device comprising a tub adapted to have abrasive media dispersed loosely therein, a fixture including a frame having a pair of outwardly extending *flanges* at opposite ends thereof extending outwardly of and supported upon said tub top, bolt means extending through said flanges and removably securing said frame to said tub, said frame having spaced depending portions suspended within said tub, a bar carried by and between said depending portions for rotation about a longitudinal axis and having said workpieces secured thereto, drive means causing said tub and fixture to move in an orbital path transverse to said axis and said abrasive media to move through an orbital path within said tub thereby causing said fixture bar to rotate about said axis and move relative to said media.

7. A workpiece finishing device as claimed in claim 6 which includes a plurality of spaced brackets fixed to said tub at opposite ends thereof, each of said brackets having shelf means supporting a threaded nut and a fixed plate above and spaced from said shelf means, a plurality of bolts extending through said flanges and said fixed plates and adapted to threadedly engage a respective one of said nuts to removably secure said frame to said tub.

8. A workpiece finishing device as claimed in claim 6 which includes a spaced pair of plates supported within and by said depending portions for rotation about a longitudinal axis, a bar extending between and fixed to d plates and having said workpieces secured thereto at ıced locations therearound and extending outwardly reof at *equal* distances from said axes.

). A workpiece finishing device as claimed in claim 8 ich includes a plurality of secondary bars extending ween and fixed to said plates and radially spaced *equitant* from said central bar and having others of said rkpieces secured thereto and wherein said secondary 's turn about said axes and move relative to said dia.

10. A workpiece finishing device as claimed in claim 9 l including a plurality of first spaced openings extend- through one set of parallel faces in said bar and a ırality of second spaced openings extending intermediate d first openings through the other set of parallel faces l having said workpieces secured thereto adjacent said ɜnings and extending outwardly thereof at equal dis- ıces from said axes, and wherein said secondary bars ve a plurality of spaced openings extending therethrough ıpted to have others of said workpieces secured adjacent ɜreto.

11. A workpiece finishing device as claimed in claim 10 l which includes bolt means extending through each of d openings removably securing said workpieces to its pective bar.

12. A method of finishing workpieces comprising the ps of supporting a workpiece on a fixture which is atable about a longitudinal axis within a tub having ·asive media dispersed therein, moving said tub and :ure through an orbital path in a plane transverse to d axis, and utilizing said orbital tub and fixture move- nt to impart orbital movement to said media within d tub and cause said fixture to rotate about said axis l move said workpiece relative to said media.

*13. A workpiece finishing device comprising,*
*ɜnclosure means containing an abrasive media,*
*fixture means adapted to support a workpiece during a finishing operation,*
*'means rotatably supporting said fixture means about a longitudinal axis, and*
*'means for effecting movement of said enclosure means and said fixture means about an orbital path transverse to said axis, and means for rotating said fixture means about said axis, whereby to move workpieces supported on said fixture relative to said media.*

*14. A workpiece finishing device comprising,*
*ı tub adapted to have an abrasive media dispersed therein,*
*ı fixture adapted to support a workpiece during a finishing operation,*
*'means causing said tub and said fixture to move in a generally orbital path transverse to a longitudinal axis and thereby effect movement of said media, and*
*'means supporting said fixture within said tub for rotation relative thereto about said axis.*

*15. A method of finishing workpieces comprising the ps of,*
*supporting a workpiece on a fixture which is rotatable about a longitudinal axis within a tub having an abrasive media therein,*
*'moving said tub and said fixture in a generally oribtal path transverse to said axis,*
*utilizing the movement of said tub and said fixture to impart movement of said abrasive media, and*

*rotating said fixture about said axis and thereby moving workpieces supported on said fixture relative to said media.*

*16. A workpiece finishing device comprising,*
*enclosure means containing an abrasive media,*
*fixture means adapted to support a workpiece during a finishing operation,*
*said fixture means including a workpiece support member disposed within said enclosure means and means supporting said member for rotation about a longitudinal axis,*
*said support member adapted to have workpieces to be finished secured thereto,*
*means for effecting movement of said enclosure means and said fixture means about a preselected orbital path transverse to said axis, and*
*means for rotating said member about said axis, whereby to move workpieces supported on said member relative to said media.*

*17. A workpiece finishing device comprising,*
*a tub adapted to have an abrasive media dispersed therein,*
*a workpiece support fixture adapted to support workpieces within said tub while a finishing operation is performed on the workpieces,*
*means causing said tub and said fixture to move about an orbital path relative to a longitudinal axis and thereby effect movement of said media with respect to workpieces supported on said fixture,*
*a pair of spaced apart support members disposed within said tub, and*
*means rotatably securing said fixture to said members, whereby said fixture and workpieces supported thereon are rotatable relative to said tub.*

*18. A method of finishing workpieces comprising the steps of,*
*supporting a workpiece on a fixture which is rotatable about a longitudinal axis within a tub having an abrasive media therein,*
*moving said tub and said fixture along a preselected orbital path transverse to said axis and thereby imparting movement to said abrasive media,*
*rotating said fixture about said axis and thereby moving the workpiece supported thereon relative to said tubs, and*
*utilizing said movement of said media and said rotation of said fixture to move the workpiece and media relative to one another and thereby perform a finishing operation on the workpiece.*

References Cited

The following references, cited by the Examiner, are of record in the patented file of this patent or the original patent.

UNITED STATES PATENTS

| | | | |
|---|---|---|---|
| 1,538,231 | 5/1925 | Abbott | 51—164 |
| 2,218,353 | 10/1940 | Gruenberg | 51—7 |
| 3,253,369 | 5/1966 | Riechert | 51—163 |

HAROLD D. WHITEHEAD, Primary Examiner

U.S. Cl. X.R.

51—313